United States Patent [19]

Takahashi et al.

[11] Patent Number: 5,444,225
[45] Date of Patent: Aug. 22, 1995

[54] SYSTEM AND PROCESS FOR READING HOLOGRAM CODE, HOLOGRAM AND CARD CONTAINING HOLOGRAM

[75] Inventors: Norio Takahashi; Takaaki Fujiyoshi, both of Tokyo, Japan

[73] Assignee: Dai Nippon Printing Co., Ltd., Tokyo, Japan

[21] Appl. No.: 40,970

[22] Filed: Mar. 31, 1993

[30] Foreign Application Priority Data

| Mar. 31, 1992 | [JP] | Japan | 4-105383 |
| Jun. 5, 1992 | [JP] | Japan | 4-171760 |
| Jun. 5, 1992 | [JP] | Japan | 4-171761 |
| Jun. 5, 1992 | [JP] | Japan | 4-171762 |
| Jun. 5, 1992 | [JP] | Japan | 4-171763 |

[51] Int. Cl.$^6$ .................................... G06K 7/10
[52] U.S. Cl. ........................ 235/457; 235/462; 359/2
[58] Field of Search ............ 235/454, 457, 462; 359/2, 22; 356/71; 283/86, 91

[56] References Cited

U.S. PATENT DOCUMENTS

| 3,643,216 | 2/1972 | Greenaway et al. | 235/457 |
| 3,819,911 | 6/1974 | Greenaway | 235/61.11 |
| 3,990,773 | 11/1976 | Gore | 350/3.5 |
| 3,995,146 | 11/1976 | Tetrev | 235/61.11 |
| 4,014,602 | 3/1977 | Ruell | 235/457 |
| 4,129,382 | 12/1978 | Greenaway | 356/71 |
| 4,143,810 | 3/1979 | Greenaway | 235/487 |
| 4,269,473 | 5/1981 | Flothmann | 350/3.61 |
| 4,568,141 | 2/1986 | Antes | 350/3.61 |
| 4,820,006 | 4/1989 | Constant | 350/3.85 |
| 5,014,121 | 5/1991 | Hasegawa et al. | 358/55 |
| 5,216,230 | 6/1993 | Nakazawa | 235/462 |
| 5,306,899 | 4/1994 | Marom et al. | 235/454 |

FOREIGN PATENT DOCUMENTS

| 0004559 | 10/1979 | European Pat. Off. . |
| 0167864 | 1/1986 | European Pat. Off. . |
| 2204319 | 5/1974 | France . |
| 2304971 | 10/1976 | France . |
| 2336740 | 7/1977 | France . |
| 59-121471 | 7/1984 | Japan | 235/457 |
| 63-61386 | 3/1988 | Japan | 235/457 |
| 196683 | 4/1989 | Japan | 235/457 |
| 4123280 | 4/1992 | Japan | 235/462 |
| 1541917 | 3/1979 | United Kingdom . |
| 1541918 | 3/1979 | United Kingdom . |

OTHER PUBLICATIONS

European Search Report dated Oct. 27, 1993.

*Primary Examiner*—John Shepperd
*Attorney, Agent, or Firm*—Fish & Richardson

[57] ABSTRACT

A hologram code reading system wherein the reconstruction light of a light source illuminates the recorded area of a hologram that contains codified data recorded as image data, and a code reading sensor is arranged at the reconstruction position of the hologram reconstruction image played back by the reconstruction light from the light source, and a control means is provided for obtaining codified data from the hologram reconstruction image readout by the code reading sensor.

28 Claims, 22 Drawing Sheets

FIG.8A    EXAMPLE OF IDENTIFICATION CODE
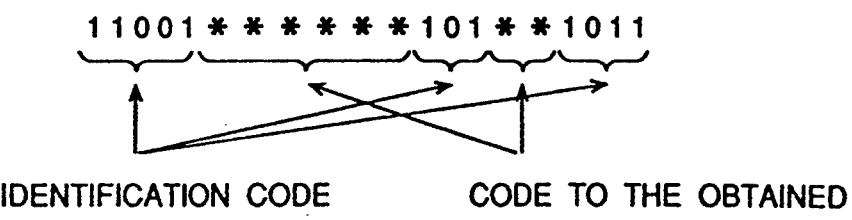
FIG.8B    READING CODE
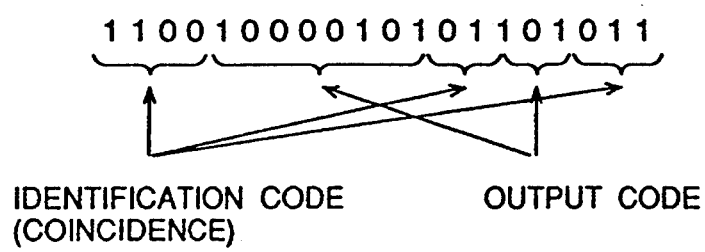
FIG.8C    OUTPUT CODE
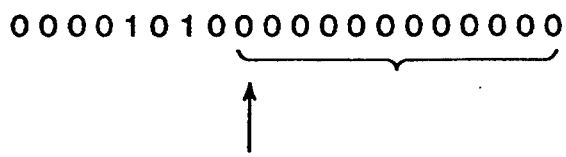

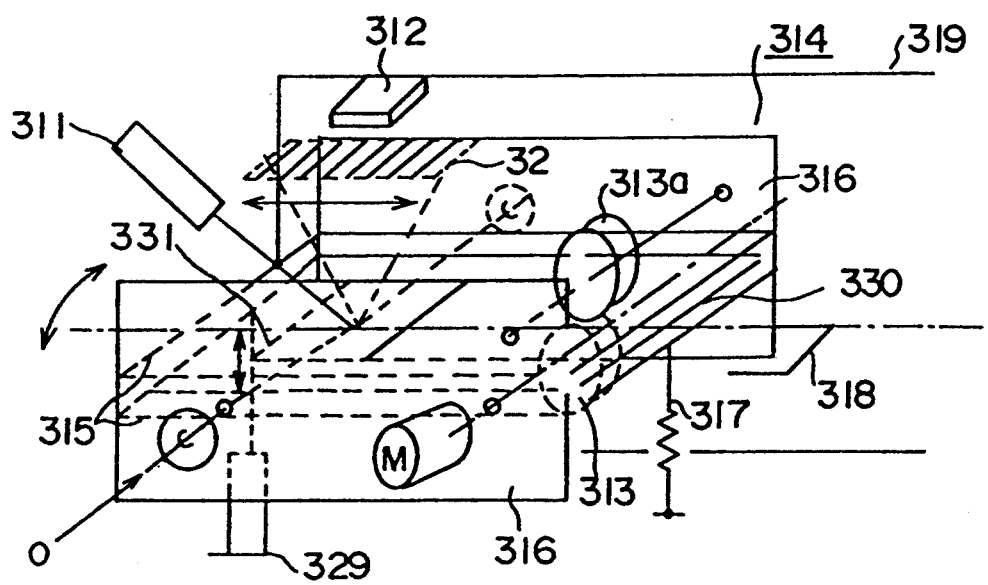
F I G. 18

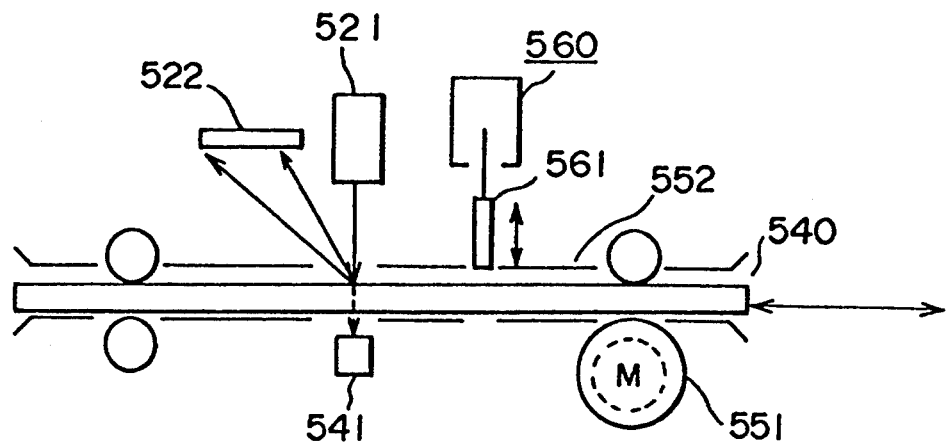
F I G. 24
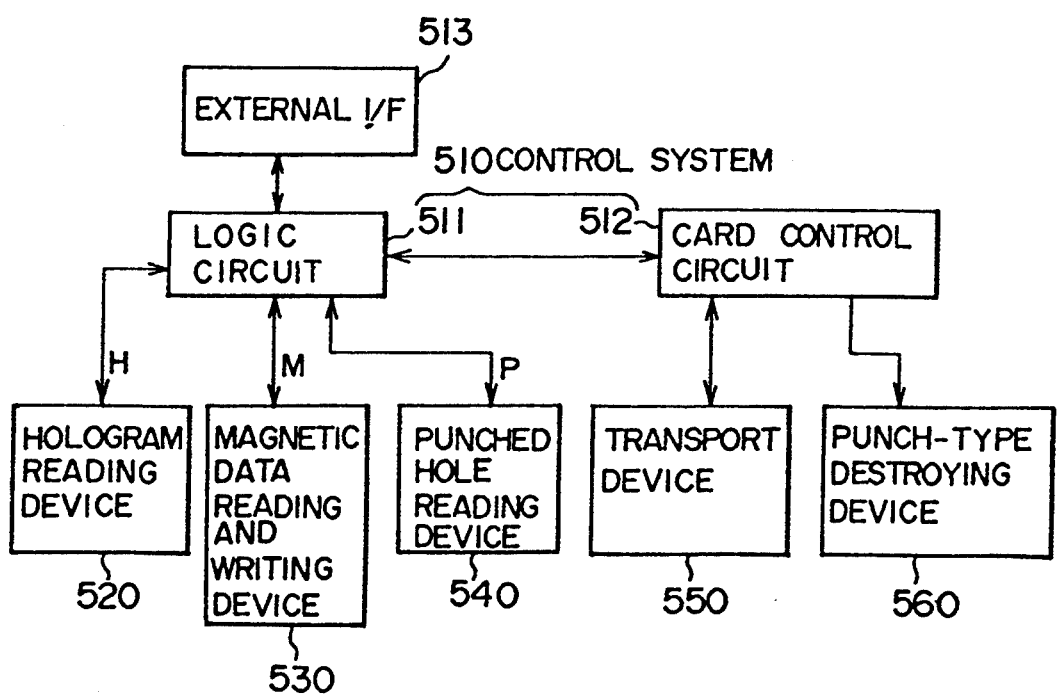
F I G. 25

SYSTEM AND PROCESS FOR READING HOLOGRAM CODE, HOLOGRAM AND CARD CONTAINING HOLOGRAM

BACKGROUND OF THE INVENTION

The present invention relates to a hologram code reading system for reading a codified hologram reconstruction image, the process by which the hologram code reading system reads the codified hologram reconstruction image, the hologram and a card provided with the hologram.

In a conventional plastic card, individual card data such as an identification number, is recorded on the card face by such means as magnetic stripe. This manner of recording has disadvantages that include the possibility of being affected by external magnetic fields that can change or erase data, and deficiency in terms of data security in that the data can be easily altered by a generally obtainable magnetic reader/writer and used illicitly.

In order to resolve this problem, Japanese Patent Laid-open No. S62-283383 describes a card whereon personal data are recorded as a hologram reconstruction image in which a combination of image form, quantity and arrangement serves as pattern data. This hologram is arranged on the card base material according to card personal data.

However, because the construction is unclear in practical terms regarding the hologram card reading device, the type of light source to be used, the type of code reading sensor to be employed, and how the readout image is processed, the following types of problems are encountered in manufacturing.

First is difficulty in recording a hologram with a short focus distance, and since the focus distance of the played back hologram image is long, the problem of large equipment size is encountered.

Second, due to production variations and other factors affecting the code reading sensor, irregularities can occur in the distance between this code reading sensor and the hologram reconstruction image, resulting in distortion and diffractions in the hologram code reconstruction image.

Third, there is the possibility of reading error if the card material on the side where the hologram is formed is soiled.

SUMMARY OF THE INVENTION

An object of this invention is to provide a hologram code reading system that resolves the above problems, can be manufactured at small size and low cost, and possesses high reading accuracy.

In order to resolve the above problems, a hologram reading system in accordance with this invention comprises a reconstruction light source for illuminating the hologram recorded area upon which codified data is recorded as image data, a code reading sensor arranged at the reconstruction hologram image reconstruction position, and a control means for obtaining the codified data from the hologram reconstruction image readout by the code reading sensor.

According to this invention, when the hologram recorded area in which codified data is recorded as image data is illuminated by reconstruction light from a light source, the hologram image is played back. This hologram reconstruction image is read by a code reading sensor, then the codified data is obtained by control means from the hologram reconstruction image.

BRIEF DESCRIPTION OF THE DRAWINGS

FIG. 8A, 8B and 8C show a description of codified data extraction for the first embodiment, FIG. 18 shows a conceptual drawing of a hologram reader embodiment according to this invention, FIG. 24 is an abbreviated drawing of the construction of a card reader/writer embodiment according to this invention, FIG. 25 shows a block diagram of a control system for the card reader/writer of FIG. 24.

DESCRIPTION OF THE PREFERRED EMBODIMENTS

Following is a description of preferred embodiments of this invention with reference to the accompanying drawings.

Figure 1:
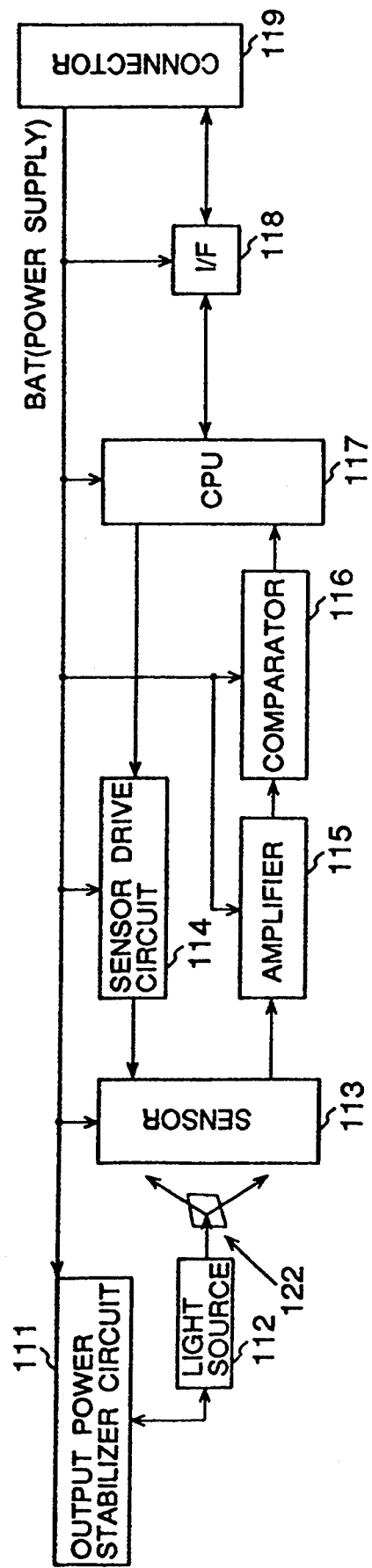
FIG. 1 shows a block diagram of a hologram code reading system according to a first embodiment of this invention.

FIGS. 1-3 show a first embodiment of this invention as a hologram code reading system. FIG. 1 is an example of a block diagram, FIG. 2 an example of an optical system construction, and FIG. 3 an example of an optical system light path.

The light source 112 produces light capable of playing back the hologram, and uses an element such as a semiconductor laser that produces light of 780 nm wavelength. This light source 112 is connected via an output power stabilizer circuit 111 to a power supply BAT. Among suitable light source elements during taking are 435 nm, 457.9 nm and 488 nm wavelength argon lasers.

By using a light source 112 for reconstruction that has a shorter wavelength than that used for recording the hologram, a sharp and good quality reconstruction image can be obtained.

Conversely, if the reconstruction light wavelength is longer in comparison to the taking wavelength, diffraction becomes difficult even beyond the position (shown by dotted lines) of a light source 112' of the same wavelength as that during taking. Since the reconstruction light incident angle can be increased to bring the reconstruction image focus position closer to and more nearly parallel with the hologram recorded area 122, a thin size design can be used for the reading system.

Also, in this embodiment, infrared light is used for the reconstruction light from the light source 112. For this reason, even if there is soiling, pencil or felt pen markings etc. on the hologram recorded area 122, the penetration feature of infrared light allows the hologram image to be played back. Also, in this case, the reconstruction light itself is invisible and people are undisturbed by light leakage from the reading system.

Figure 2A:
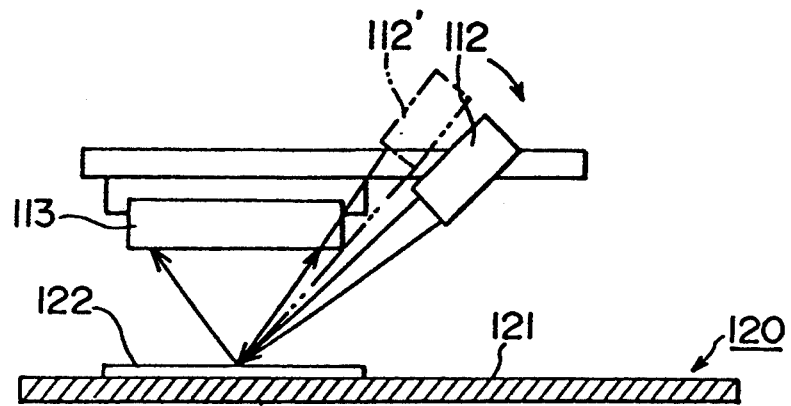
FIG. 2A and 2B show construction of an optical system for a hologram code reading system according to the first embodiment.

The hologram code of this invention, which can be used for such documents as bank deposit books, securities, warranty certificates, passports, drivers licenses, etc., as represented by a card 120 in FIG. 2A, can be made from a base material 121 such as plastic, paper, metal or other material, and provided with a hologram recorded area 122. A barcode is recorded as a hologram image in the hologram recorded area 122.

Figure 2B:
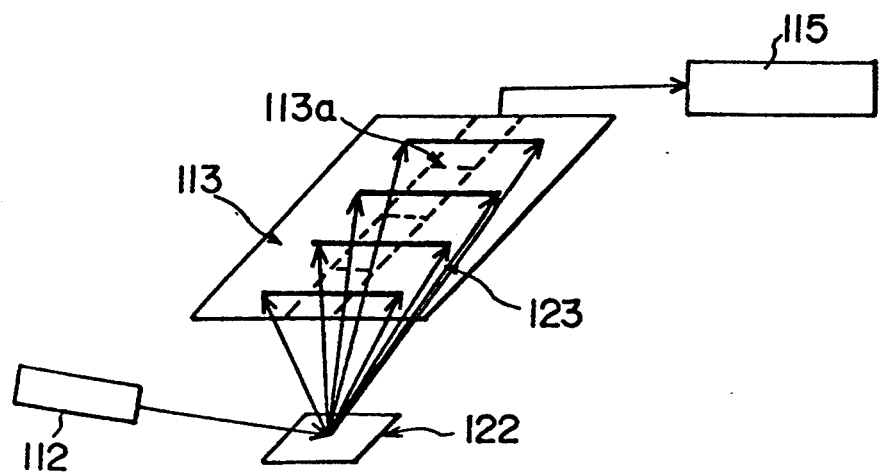

When reconstruction light from the light source 112 illuminates the hologram recorded area 122, as indicated in FIG. 2B, a hologram reconstruction image 123 is focused at a distance predetermined by the taking conditions.

Since it is difficult to produce a hologram with a short focus distance, if the focus distance can be shortened by the optical system, the equipment size can be effectively reduced. In addition, light loss can be reduced, as well as the distance between the code reading sensor and hologram recorded area.

Figure 3A:
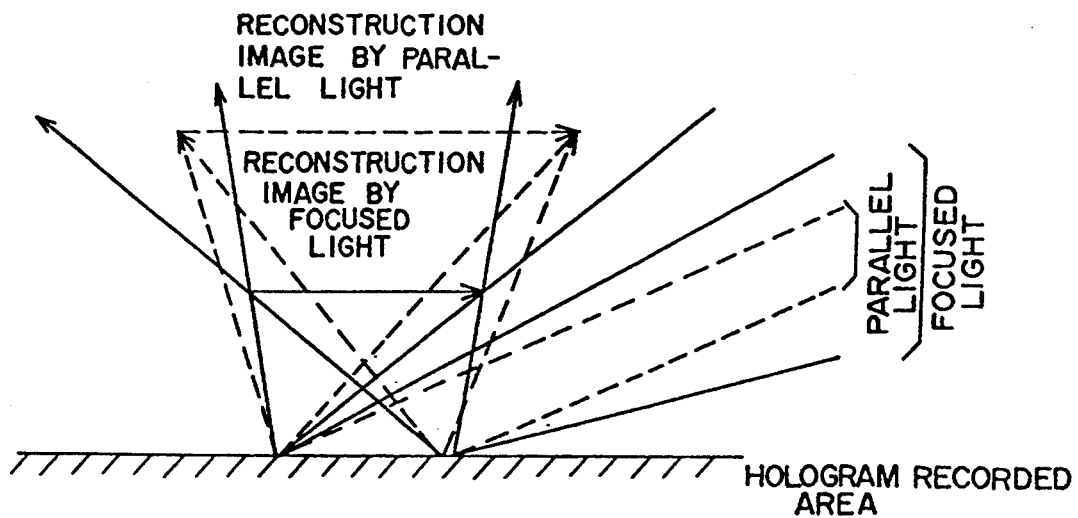
FIG. 3A and 3B show optical paths for an optical system for a hologram code reading system according to the first embodiment.

A focus lens system is included in the light source 112. As indicated in FIG. 3A, by using focused light (solid lines) for the reconstruction light, in comparison with parallel light (broken lines), the focus is brought closer to the hologram recorded area 122. In regard to focus accuracy, an aperture angle of 0.5 degrees (a)—10 degrees (b) is desirable. If less than (a), the focus distance from the hologram increases and becomes similar to that with parallel light and is thus not desirable. Conversely, if greater than (b), the reconstruction image becomes distorted and an image with good contrast cannot be obtained, which is also not desirable. The optimum range is between 1 degree (c) and 5 degrees (d). In this embodiment, the angle is taken as 2.2 degrees with respect to parallel light.

Figure 3B:
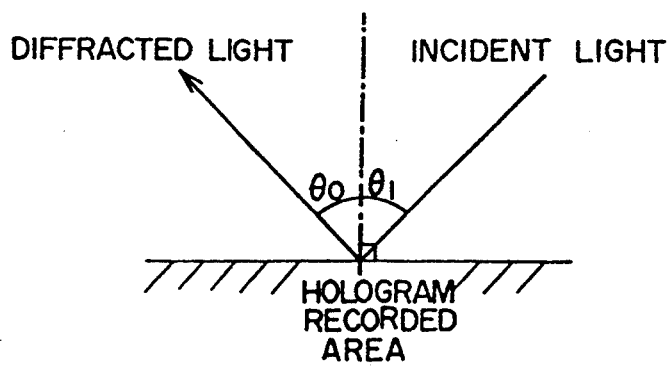
Figure 3C:
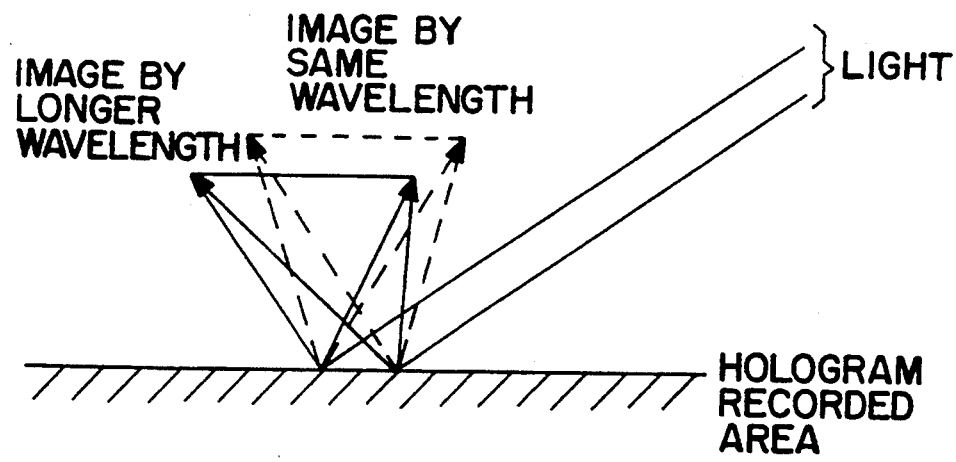
FIG. 3C and 3D show the effects of changing the reading light wavelength on the position of the reconstructed image.
Figure 3D:
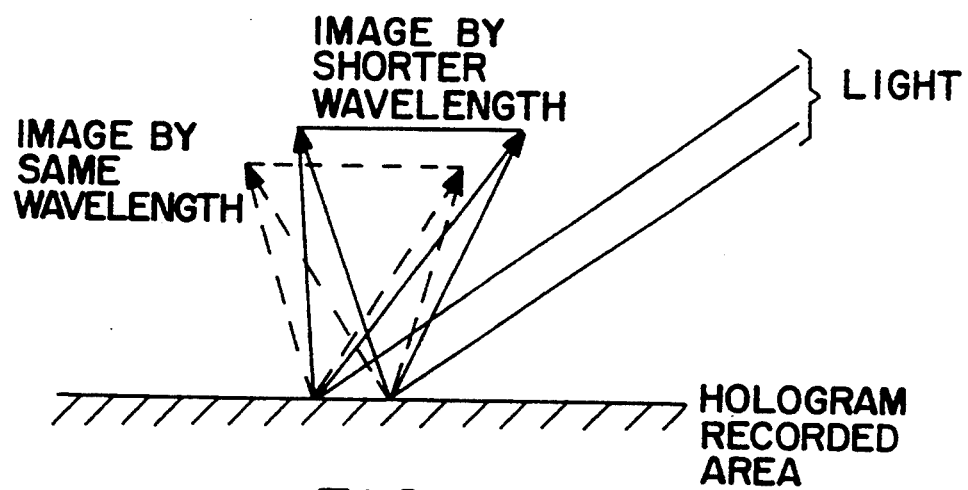

This principle can be understood from FIG. 3B and the following formula.

$$d = n\lambda/(\sin\theta o)$$

In the above, d: diffraction grating pitch,
n: integer,
$\lambda$: wavelength.

A code reading sensor 113 is arranged at the focus position of the hologram reconstruction image 123. This code reading sensor 113 is for detecting the hologram reconstruction image 123, and can utilize such means as a CCD image sensor-with pixels 113a arranged in lines.

Since the code reading sensor 113 is large with many terminals and installation is difficult, it is mounted in parallel with the circuit board.

Figure 9:
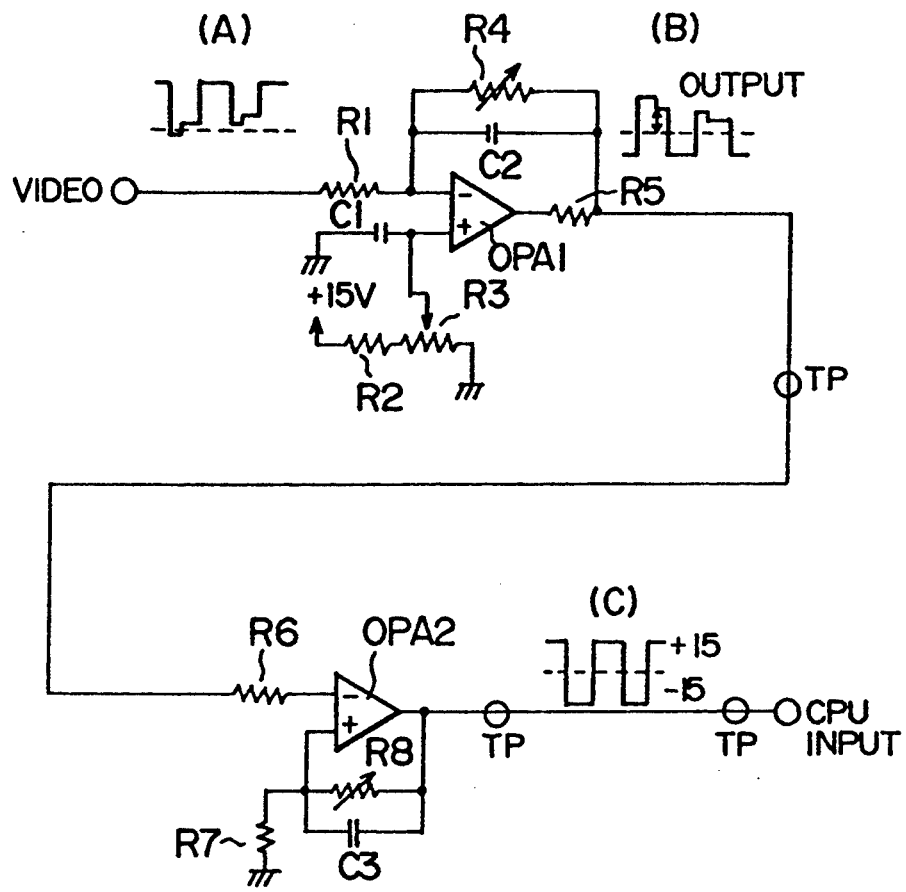
FIG. 9 shows a circuit schematic diagram of a comparator for the first embodiment.

The code reading sensor 113 is controlled by a control signal from a CPU 117 via a sensor drive circuit 114. The code reading sensor 113 output is amplified by an amplifier 115 which includes a gain adjustment function, and connected to a comparator 116. The comparator 116 possesses a threshold value adjustment function and this output is connected to the CPU 117. A circuit example for the comparator 116 is shown in FIG. 9.

The CPU 117 performs such functions as determining whether or not the detected barcode is valid, and includes a memory for storing identification codes and setting values. The CPU 117 output is connected via an interface (I/F) circuit 118 to a connector 119 for connecting such systems as a personal computer (not shown in the figure).

FIGS. 4-7 are flowcharts for describing the operation of the embodiment of this invention as a hologram code reading system.

Figure 4:
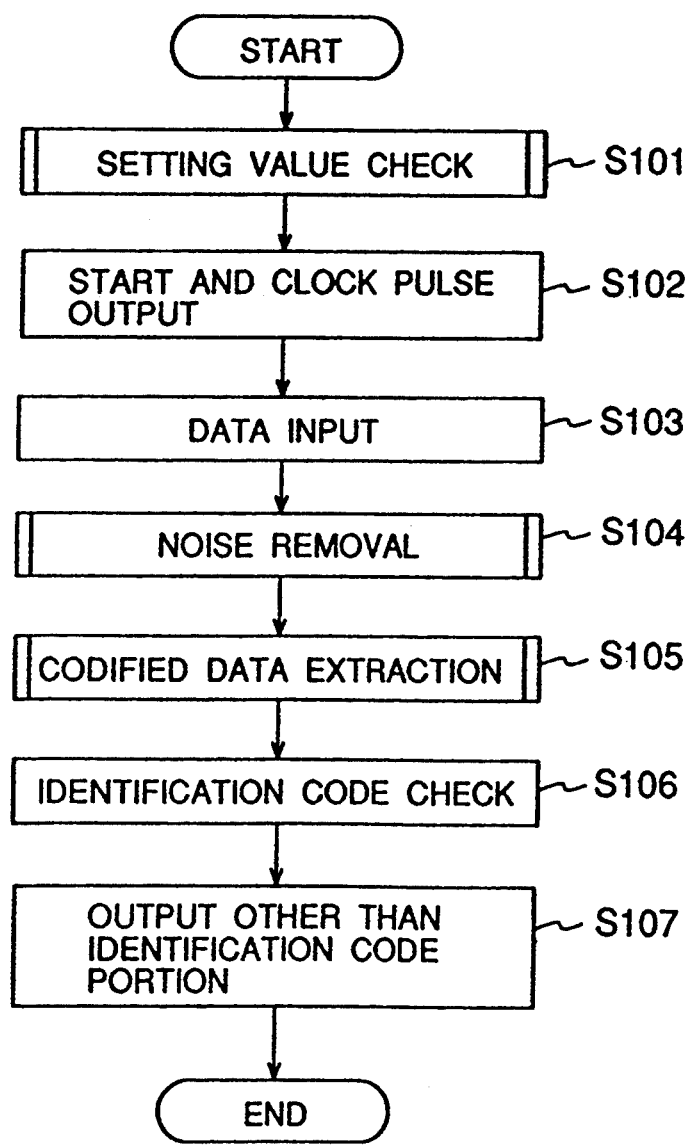
FIG. 4 shows a flowchart for describing the main operation of a hologram code reading system according to the first embodiment of this invention.
Figure 5:
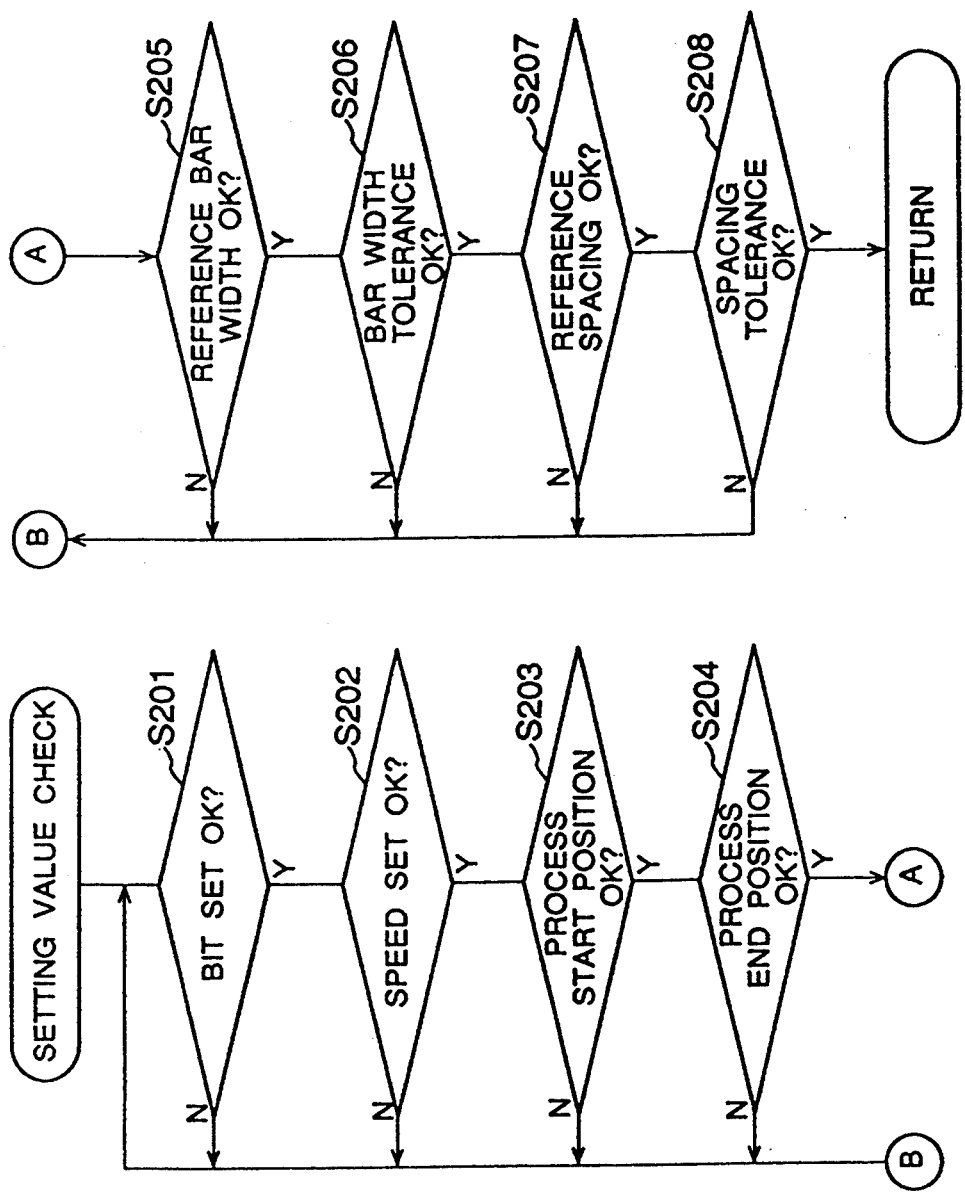
FIG. 5 shows a flowchart for describing the setting value check subroutine operation of a hologram code reading system according to the first embodiment of this invention.

At step 101 of the main flow indicated in FIG. 4, various setting values are checked. The setting values are checked in a sequence such as shown by the setting value check subroutine of FIG. 5. The example of FIG. 5 indicates the checking sequence: bit set S201, speed set S202, process start position S203, process end position S204, reference bar width S205, bar width tolerance S206, reference spacing S207, and spacing tolerance S207.

At completion of the setting value check of S101, start and clock pulse outputs S102 are produced and data input S103 is performed.

Figure 6:
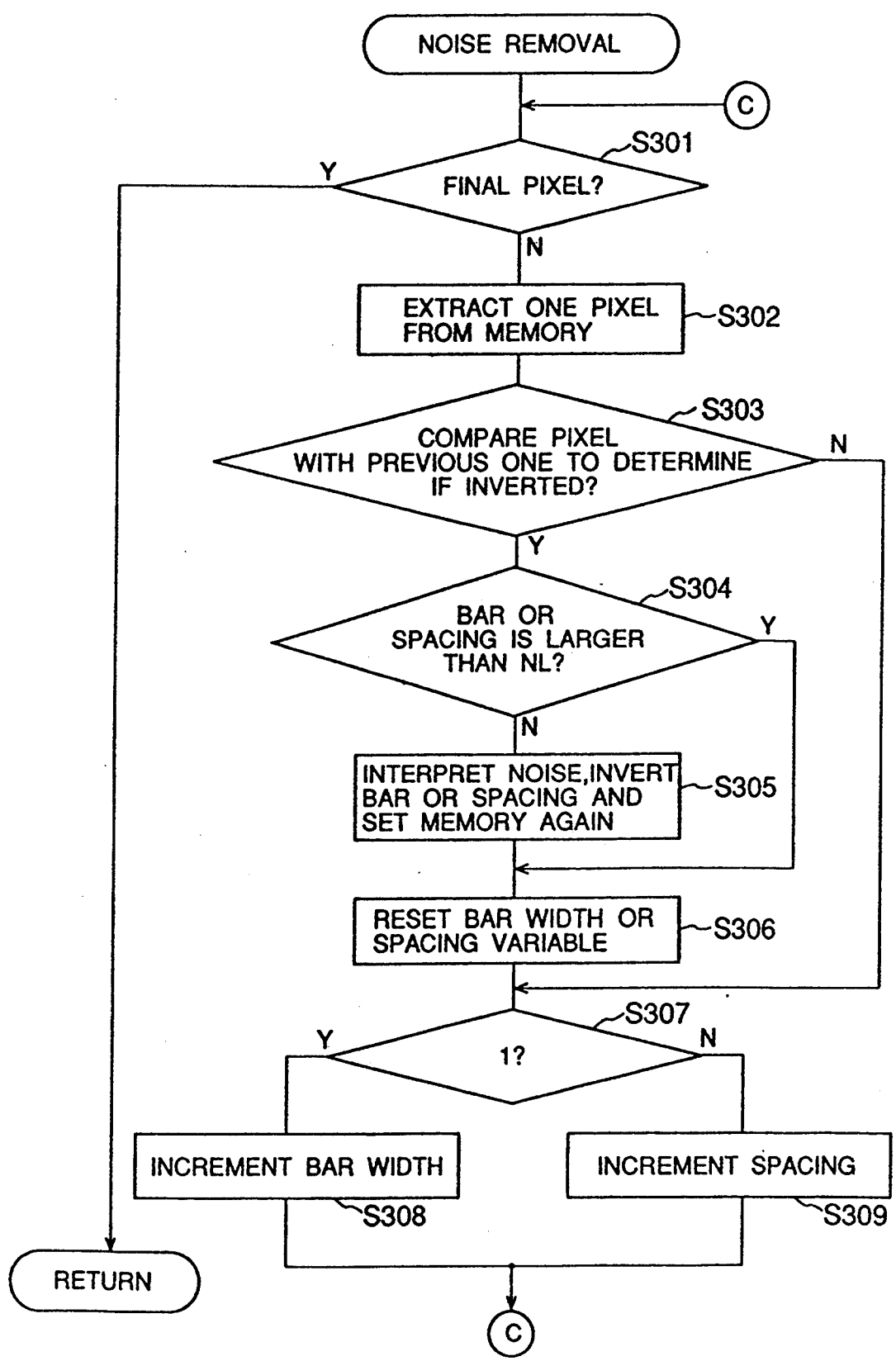
FIG. 6 shows a flowchart for describing noise removal processing for a hologram code reading system according to the first embodiment of this invention.

At step S104, a noise removal process such as indicated in FIG. 6 S301–S309 is performed. In the noise removal process, in order to prevent codified data reading error, pattern noise due to soiling or omissions and electrical noise are removed.

The presence or absence of the final pixel is determined S301 and if the final pixel is absent, one pixel of the memory internal data at a time is extracted S302. Each is compared with the previous pixel to determine whether not it is inverted S303. If the pixel is inverted, the bar width or spacing is compared with noise upper limit value (NL) S304.

$$NL = iNT(BS \times \epsilon)$$

In the above:
iNT: rounded off integer
BS: reference bar width
$\epsilon$: tolerance (e.g., 0.05 mm)

The reference bar width is computed during input. If the bar width or spacing is larger than NL, the bar width or spacing variable is reset and again computed S306, then proceed to step 307.

If the bar width or spacing is smaller than NL, noise is interpreted and the bar or spacing is inverted (1 to 0, or 0 to 1) and the memory is again set to the same position S305, the spacing is incremented S309, then return to step S301.

Figure 7:
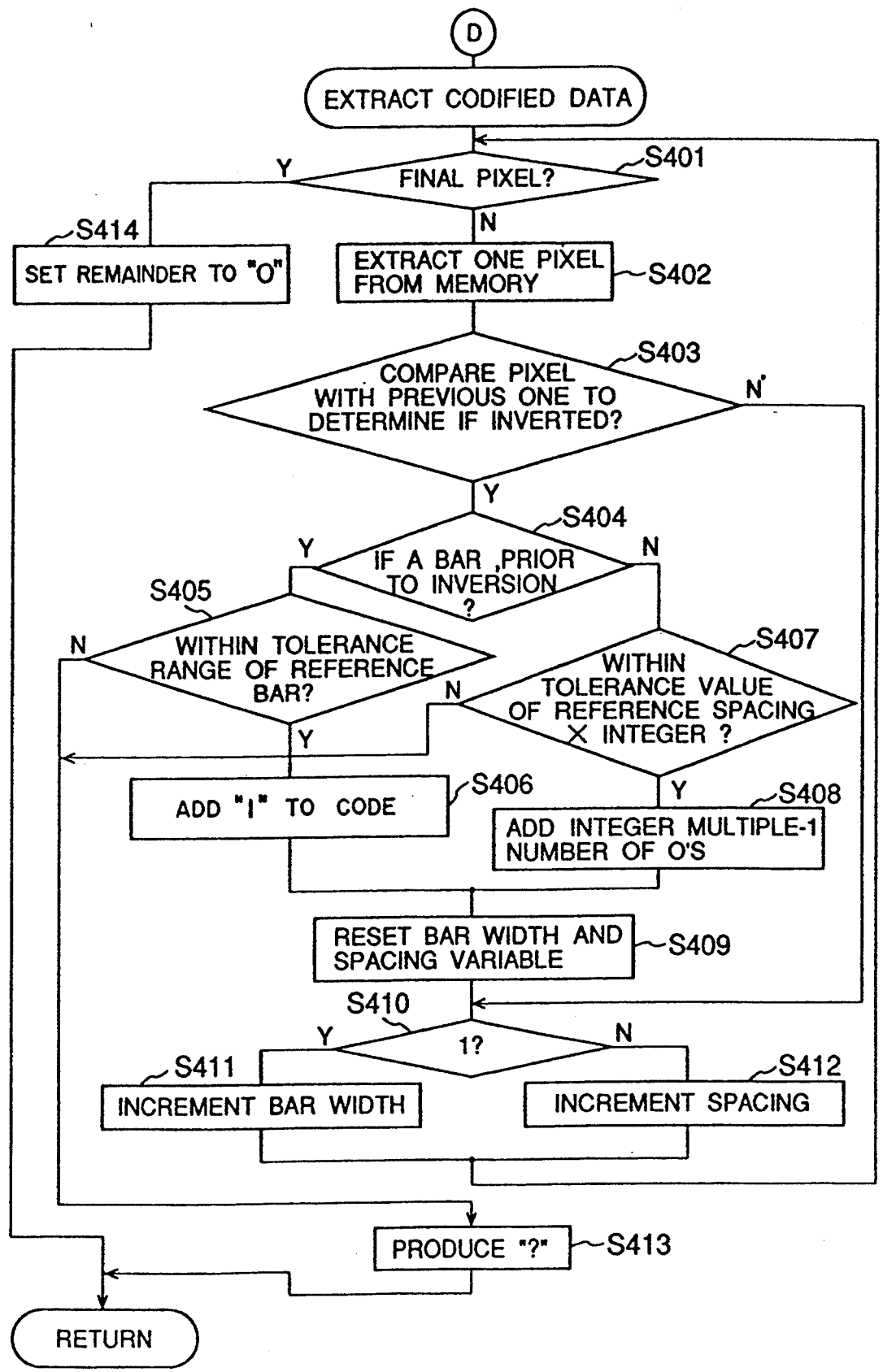
FIG. 7 shows a flowchart for describing a codified data extraction process for a hologram code reading system according to the first embodiment of this invention.

Next, at step S105 of FIG. 4, the codified data extraction process shown in FIG. 7 (S401–S414) is performed. In this codified data extraction process, the data coded by the bar widths and spaces (number of pixels between bar center positions) is obtained.

The pixel is first checked as to whether or not it is the final pixel S401. If it is not the final pixel, one pixel at a time is obtained from the memory S402. Each is compared with the previous pixel to determine whether or not it is inverted S403.

If inverted, whether or not the pixel was a bar (i.e., 1) prior to inversion is determined S404. If a bar, whether or not the bar width was within the tolerance range of the reference bar width is determined S405. If the bar width was within the tolerance, 1 is added to the code, then proceed to step S409. If outside the tolerance, code "P" signifying "cannot read" is produced S413.

On the other hand, if not a bar, whether or not the space is within the tolerance value of the reference spacing x an integer is determined S407. If within the tolerance, the "integer multiple—1" number of 0's are added to the code S408, then proceed to step S409. If outside the tolerance, proceed to step S413.

At step S409, the bar width and spacing variables are reset, then proceed to step S410.

At step S410, whether or not 1 (within bar width) is determined, and if 1 (within bar width), the bar width is incremented S411. If 0 (within space), space is incremented S412, then return to step S401.

At step S401, if the final pixel, the remainder is set to 0, then return.

Next, at FIG. 4 step S106, identification code check is performed. An example of a code arrangement is shown in FIG. 8A, where the identification code is divided among three locations which straddle the code to be obtained. When the identification code is arranged within the reading code, as shown in FIG. 8B, the output code only is obtained as shown in FIG. 8C. Where identification code digits are not filled, 0's are inserted.

Unless the identification code is alined within the reading code, "+" data is produced to signify identification code error. At step S107, the output other than the identification code portion is obtained.

Figure 10:
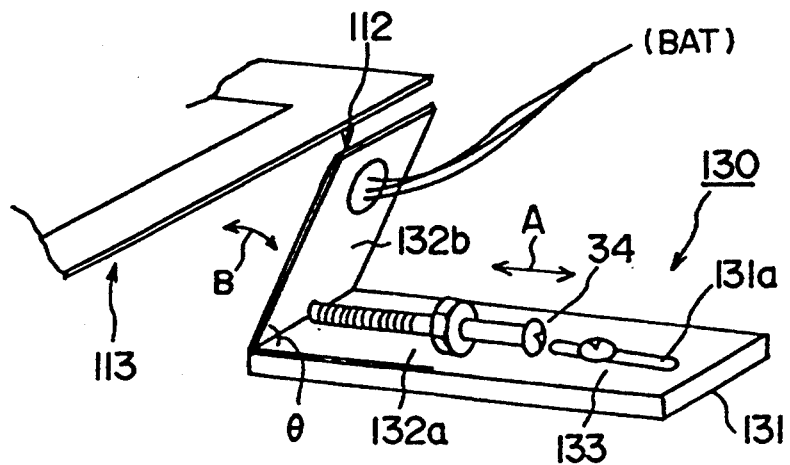
FIG. 10 shows a second embodiment of this invention as a hologram code reading system.

FIG. 10 shows a second embodiment of this invention as a hologram code reading system.

In this second embodiment, a position adjustment means 130 is provided for the light source 112. The position adjustment means 130 comprises a mounting plate 132 provided for the base plate 131. The mounting plate 132 is made of a flexible material such as phosphor bronze and can be shifted in the direction indicated by arrow A. The mounting plate 132 comprises a base section 132a which is secured to the base plate 131, and mounting section 132b which is inclined by only an angle theta (for example, approximately 15–85 degrees) with respect to the base section 132a. A light source 112, such as an LED is provided on this mounting section 132b.

An oblong hole 131a is formed in the base plate 131, after performing coarse adjustment by overall shifting front to rear, the base plate 131 is secured by a screw 133. Also, a fine adjustment screw 134 is provided at the rear of the mounting plate 132 mounting section 132b. The mounting section 132b inclination is adjusted by turning the fine adjustment screw 134. Variability is thus provided for the distance between the code reading sensor 113 and the light source 112.

Figure 11:
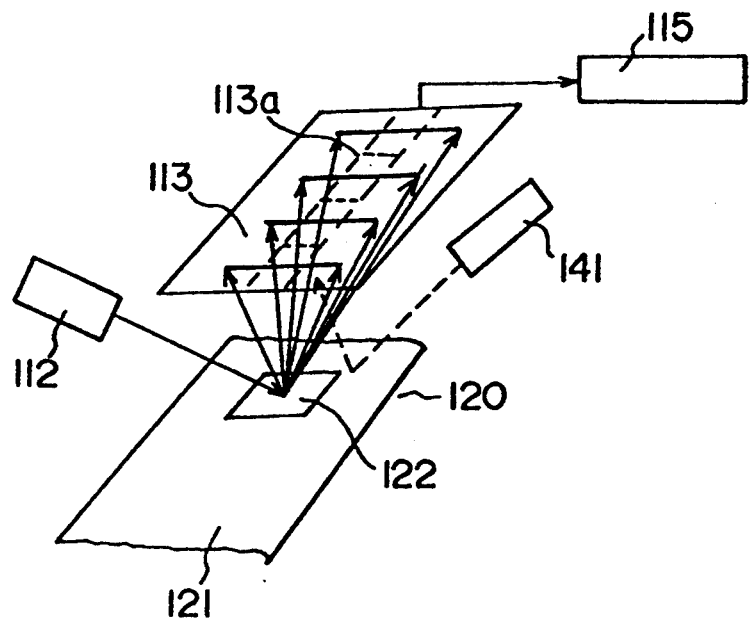
FIG. 11 shows a third embodiment of this invention as a hologram code reading system.

FIG. 11 shows a third embodiment of this invention as a hologram code reading system.

In this third embodiment, in addition to the light source 112, a light source 141 for position measurement is provided. An LED or other device is used for this light source 141 for position measurement. By detecting light directly reflected from the card base material 121 by the code reading sensor 113, the distance between the card 120 (hologram recorded area 122) and code reading sensor 113 can be detected.

By detecting this distance, the bar width can be compensated and detection error due to bar code image refraction or distortion arising from such causes as variations in the code reading sensor 113 mounting position can be prevented.

Figure 12:
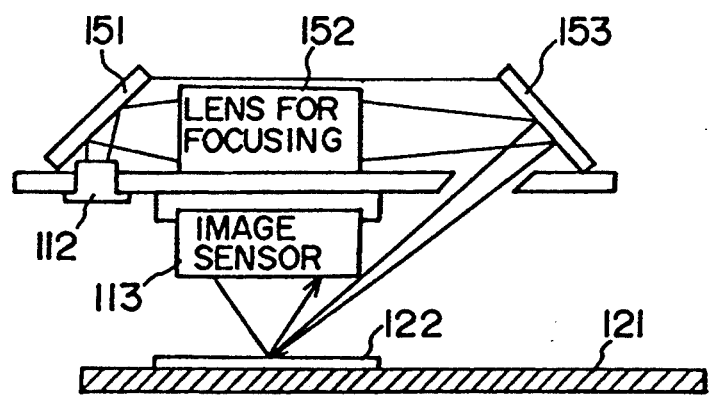
FIG. 12 shows a fourth embodiment of this invention as a hologram code reading system.
Figure 13:
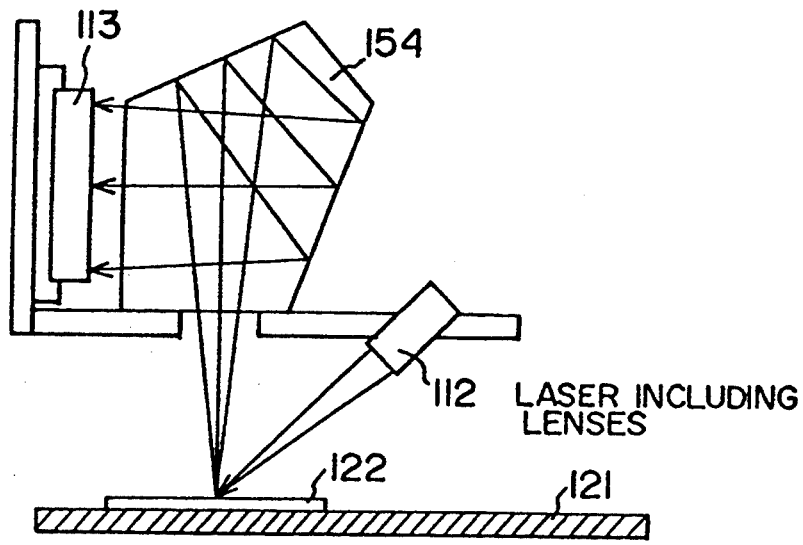
FIG. 13 shows a fifth embodiment of this invention as a hologram code reading system.

FIGS. 12 and 13 show fourth and fifth embodiments of this invention as hologram code reading systems.

In a fourth embodiment, light via mirror 151 from a semiconductor laser or other light source 112 is condensed by a condenser lens system 152, then again reflected by mirror 153 to illuminate the hologram recorded area 122.

By providing this type of optical system using mirrors and other elements at the light source side, since the light path length is conserved, use of thick lenses is not required and aberrations are reduced. Also, since the lens system is arranged horizontally, installation is easy and compact system design is enabled.

In a fifth embodiment, light reflected by the hologram recorded area 122 is refracted by a prism 154 and readout by a code reading sensor 113 arranged perpendicularly to the hologram recorded area 122.

In this manner as well, by providing a prism 154 at the sensor side, the light path is conserved and compact system design is enabled. Also, the depth of focus of the hologram reconstruction image is increased, providing the advantage of avoiding reading error.

Figure 14:
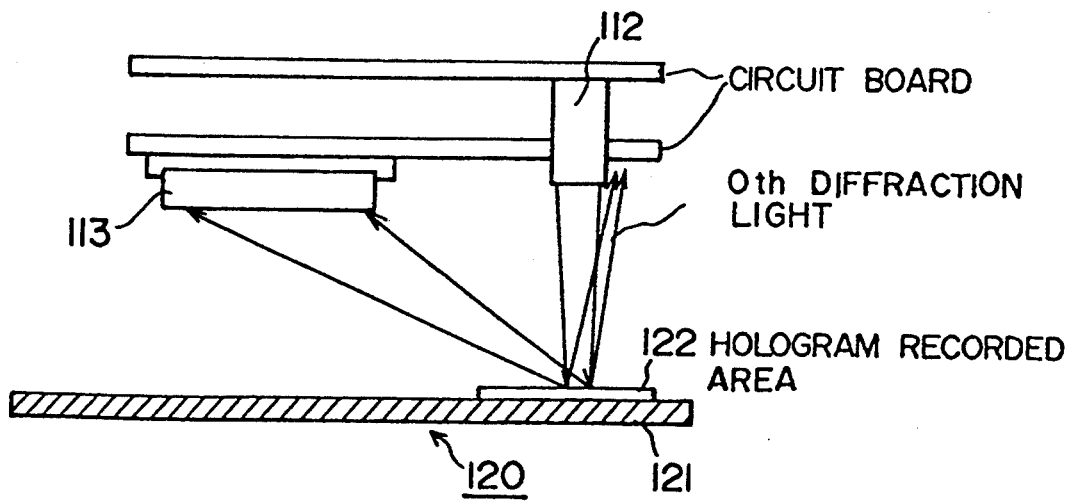
FIG. 14 shows a sixth embodiment of this invention as a hologram code reading system.

FIG. 14 shows a sixth embodiment of this invention as a hologram code reading system.

In this embodiment, a semiconductor laser light source 112 is arranged perpendicularly with respect to two system circuit boards. This composition allows good mounting accuracy and easy securing of the semiconductor laser. Also, since the code reading sensor 113 comprises a line sensor which has many terminals and a large area, the system circuit boards are arranged in parallel. In the composition shown in the figure, since circuits can be formed between two system circuit boards, an extremely compact hologram code reading system can be composed, which can also be incorporated into other systems such as a conventional magnetic card reader.

In the hologram code reading system of FIG. 14, since the reconstruction light from the hologram code reading system light source 112 is emitted perpendicularly with respect to the hologram recorded area 122, it is necessary that illumination during hologram taking is perpendicular with respect to the hologram area, or to arrange the code, which is the object being taken, at the reading system line sensor position.

In addition, if the light source 112 is arranged perpendicularly to the hologram recorded area 122, 0-order diffracted light reflected from the hologram recorded area 122 is emitted toward the light source 112. Since the 0-order diffracted light reflected from the hologram recorded area 122 and the light from the light source 112 are not coherent, noise enters the hologram reconstruction image, and the reconstruction image quality deteriorates. This is undesirable since operating error can occur when the codified data is obtained after reading by the code reading sensor 113.

Therefore, it is desirable to incline the light source 112 with respect to the hologram recorded area 122 vertical line to the extent 0-order diffracted light is not emitted from the hologram recorded area 122. In practice, although affected by such factors as diameter of the reconstruction light from the light source, distance between the light source and hologram recorded area, and reconstruction light focus, the range of 0.1 to 10 degrees is suitable, with the range of 0.5 to 2 degrees desirable.

As a hologram suitable for this invention, for the purpose of concealing the hologram code from visibility under white light, a Fresnel hologram is desirable which can be played back only by single wavelength coherent light. In addition, a relief hologram is desirable, in which the strength distribution of refringent light from the object light and illuminating light is recorded in the form of surface irregularities. In contrast to reproducibility by only such optical means as a Lippmann hologram, the surface irregularities of a relief hologram can be reproduced in large volume and low cost by mechanical means such as simple embossing on such resin compounds as ultraviolet hardened resin or thermoplastic resin.

Also, in the case of such examples of hologram usage methods in accordance with this invention as the above mentioned cards and passports, by applying a relief hologram via heat sensitive cement or adhesive agents, then coating the irregular surface of the hologram with aluminum, zinc sulphide or titanium sulphide by such conventional methods as vacuum depositing or sputtering, a reflection type hologram can be produced which has the reconstruction image focused at the reconstruction illumination incident side.

In addition, in order to conceal the hologram code, the object image is transferred by the reconstruction light from a taken hologram H1 via a slit to another hologram H2 in a two step process. In the rainbow hologram played back under white light, of the above mentioned hologram code recorded Fresnel hologram and hologram produced by multiple exposure, since only the object image is focused, a rainbow hologram recorded with a simple object image can be used, while the recording of the hologram code is difficult to discern visually.

Also, when single wavelength coherent light illuminates the hologram produced by multiple exposure of the rainbow hologram and Fresnel hologram, since in addition to the hologram code, the image of the slit used for the two step process is focused, it is desirable to overlap the hologram focus and slit focus positions at the reading position of the code reading sensor. In particular, when substantially perpendicular reconstruction illuminating light is emitted with respect to the hologram recorded area, positioning the reconstruction illuminating light at the reflecting side so as to straddle the hologram code and slit focus positions is desirable.

This invention is not limited to the foregoing embodiments, and numerous variations are possible.

For the comparator 116, an integrator can be provided at the reference voltage side to perform automatic setting of the threshold value, or software can be used by which the threshold value is computed in a first step, then detected in a second step.

In addition to a hologram barcode, systems can also be constructed for use with other optical barcodes or combined use with magnetic barcodes.

As described above, by this invention, reading accuracy is improved together with enabling a compact optical system and low cost construction. Also, double security can be obtained by using a non-visible laser for reading and code verification.

Figure 15:
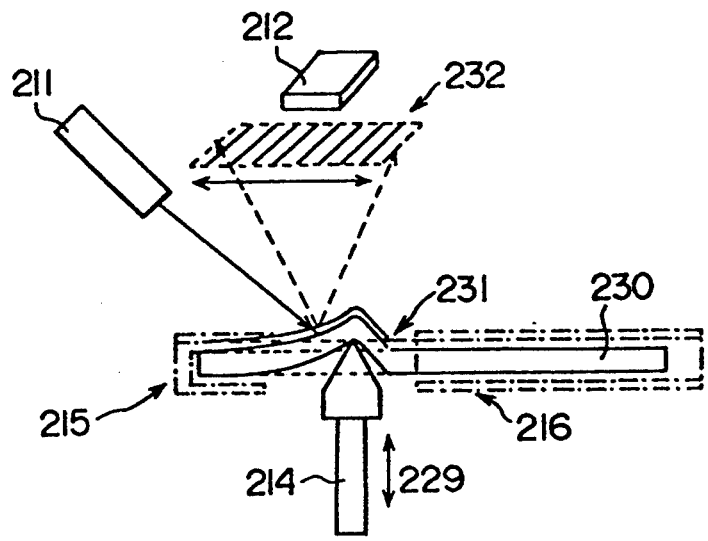
FIG. 15 shows a conceptual drawing of a hologram reader embodiment according to this invention.
Figure 16:
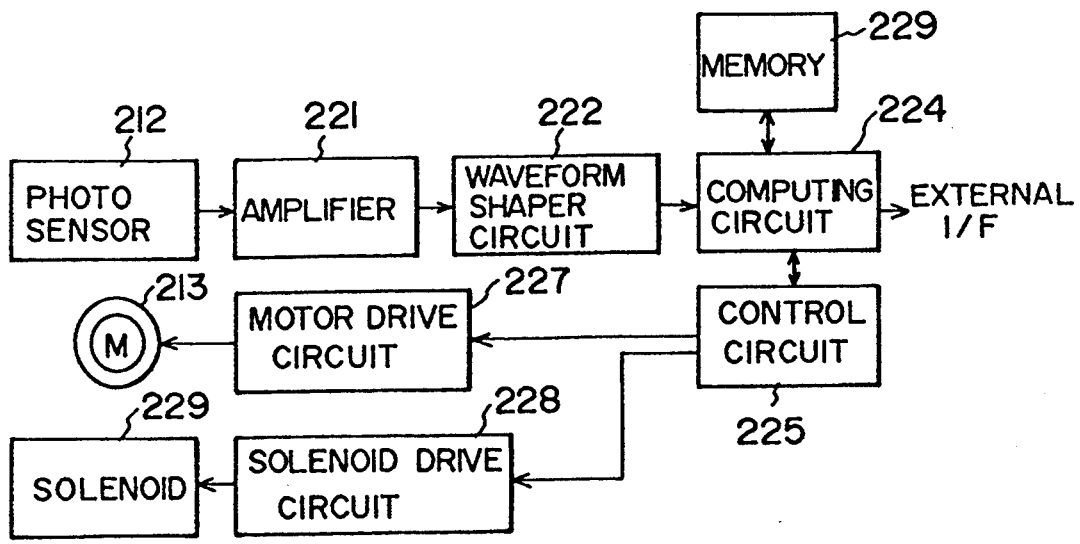
FIG. 16 shows a circuit block diagram of the FIG. 15 embodiment.
Figure 17:
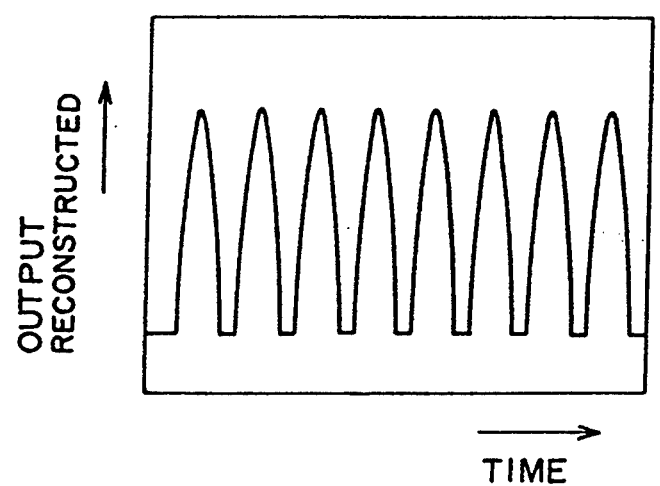
FIG. 17 shows a waveform diagram of the reconstruction output of the FIG. 15 embodiment.

FIG. 15 shows a conceptual drawing of a hologram reader embodiment in accordance with this invention. FIG. 16 shows an example of a circuit block diagram and FIG. 17 shows an example of a reconstruction output waveform. Portions with the same functions as in the previously described conventional example are designated by the same symbols.

The hologram reader of this embodiment is provided with guide rails 215 and 216 at both sides (front and rear in the transport direction) of the card 230 reading position and control the card 230.

A curved element 214 is arranged at the rear of the hologram 231. When the card 230 is at the reading position, this curved element 214 is shifted vertically by a solenoid 229, which is a direct acting actuator, so that card 230 is bent upward from the rear.

Next, the operation of the hologram reader of this embodiment is described together with the circuit composition.

When the card 230 is inserted, a control circuit 225 in the CPU turns a motor M via a motor drive circuit 227. The motor M turns a transport roller 213 to transport the card 230 to the reading position (FIG. 15 position).

Laser light is oscillated from a laser oscillator 211, which as reconstruction light illuminates the hologram 231 of the card 230 to produce a reconstruction image 232 at a predetermined position.

A photosensor 212 is composed of a single element such as a photodiode and converts the reconstruction image 232 into an electrical detection signal. The detection signal is amplified by an amplifier 221 and shaped by a waveform shaper circuit 222, then connected to a computing circuit 224 in the CPU.

The computing circuit 224 enters the input signal sequentially into a memory 226. The control circuit 225 is synchronized to this, and via the solenoid drive circuit 228 energizes the solenoid 229 to raise the curved element 214.

When the curved element 214 bends the card 230, it is equivalent to changing the incident angle of the laser light (reconstruction light) oscillated from the laser oscillator 211, and the spatial reconstruction image 232 in FIG. 15 is shifted left and right.

The card 230 is bent in the vertical direction by the solenoid 229, and since the bent portion is limited by the guide rails 215 and 216, measurement can be performed, without changing parameters in the optical system other than the incident angle.

As a consequence, even if the bar code pattern recorded in the hologram 231 is long, as shown in FIG. 17, all data can be readout continuously by the photosensor composed of a single element.

When the solenoid 229 energizing is released, the card 230 returns by its own resilience to its original (flat) shape.

The above described embodiment does not limit the numerous possible variations. For example, the means for bending the hologram recorded section can also have a semi-cylindrical or other shape, or can also function to press both ends of the card.

As described in the foregoing, according to this invention, since the reconstruction image position is shifted by the process of bending the recorded section so as to bend the hologram recorded area, even with a reconstruction image detecting means using a detector section smaller than the reconstruction image, the entire reconstruction image can be detected.

Consequently, the detector section does not need to use a large and costly photosensor, and a hologram reader can be designed at reduced cost. Also, the hologram recording amount on the data recording medium can be increased.

FIG. 18 shows a conceptual drawing of another embodiment of this invention as a hologram reader. In this embodiment, when the card 330 is at the reading position, a rotating means 314 rotates the card 330.

The rotating means 314 comprises a transport roller turned by a motor M for transporting the card 300 to the reading position, two card supporting plates 315 for supporting the top and bottom of the card 330, two frames 316 secured to both sides of these card supporting plates 315 at the rotational axis 0 center and supporting so as to enable rotation with respect to the system frame 319, a solenoid 329 for pressing the card supporting frames vertically upward so that the frames 316 are turned about the rotational axis 0 center, a stopping plate 318 for regulating the card supporting plates 315, and a spring 317 for returning to the reference position.

Following is a description of the operation and circuit construction of a card reader according to this embodiment.

When a card 300 is inserted, the control circuit 325 in the CPU turns the transport roller 313 via the motor drive circuit 327 and motor M to transport the card 330 to the reading position (FIG. 18 position).

Laser light is oscillated from the laser oscillator 311, which as reconstruction light illuminates the hologram 331 of the card 330 to reproduce the reconstruction image 332 at the predetermined position.

A photosensor 312 utilizes a single element such as a photodiode and converts the reconstruction image 332 into an electrical detection signal. This detection signal is amplified by an amplifier 321, shaped by a waveform shaping circuit 322 and connected to a computing circuit 324.

The computing circuit 324, inserts the input signal sequentially into a memory 326. In synchronization with this, the control circuit 325 energizes the solenoid 329 via the solenoid drive circuit 328, so as to press the card supporting plates 315 of the rotating means upwards.

When the card supporting plates 315 are pressed upwards, the frame 316 rotates together with the card supporting plates 315 about the center axis 0, and the card 330 rotates in unison. When the card 330 is rotated in this manner, the result is equivalent to changing the incident angle of the laser light (reconstruction light) oscillated from the laser oscillator 311, and the reconstruction image 332 is shifted left and right in the space (FIG. 18).

The oscillated laser light from the laser oscillator 311 illuminates the rotational axis 0 from above at the upper side of the card supporting plates 315. An adequate size opening is provided so that the laser light is not blocked as a result of rotation.

The card 330 is pressed in the vertical direction by the solenoid 329 and inclines together with the rotating means 314 centered about the rotational axis O. Since the card 330 is supported and secured by the card supporting plates 315 and transport roller 313, measurement can be performed without changing parameters other than the incident angle with the optical system.

As a consequence, even if the bar code pattern recorded in the hologram 331 is long, as shown in FIG. 17, all data can be read out continuously by the photosensor 312 composed of a single element.

When the solenoid 329 energizing is released, the frame 316 is rotated in reverse by the spring 317 until it contacts the stop plate 318, thus returning to the reference (horizontal) position.

The above described embodiment does not limit the numerous possible variations. For example, the means for rotating the hologram recording section can be achieved by transferring the motor rotational force directly or by speed reduction.

As described in the foregoing, according to this invention, since the reconstruction image position is shifted by rotating the hologram recorded area by the recorded area rotating means, the entire reconstruction image can be detected even with a reconstruction image detecting means using a detector section smaller than the reconstruction image.

Consequently, the detector section does not need to use a large and costly photosensor, and a hologram reader can be designed at reduced cost. Also, the hologram recording amount on the data recording medium can be increased.

Figure 19:
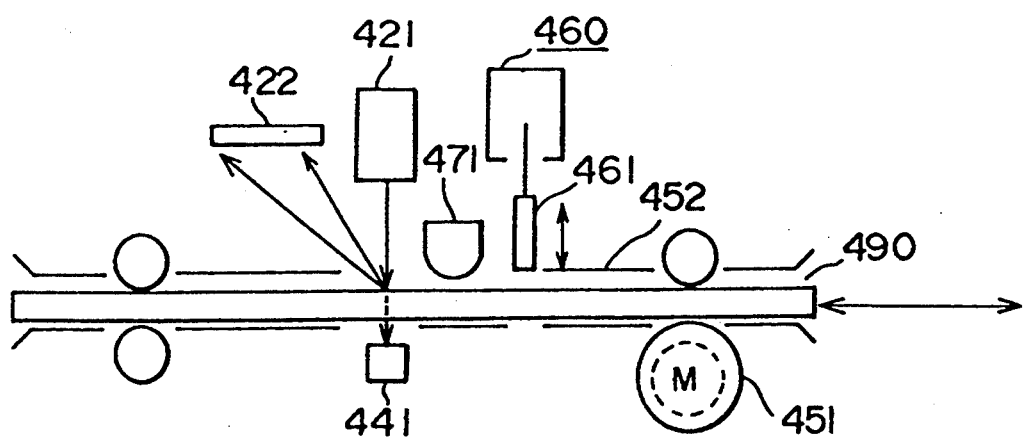
FIG. 19 is an abbreviated drawing of the construction of a card reader/writer embodiment according to this invention.
Figure 20:
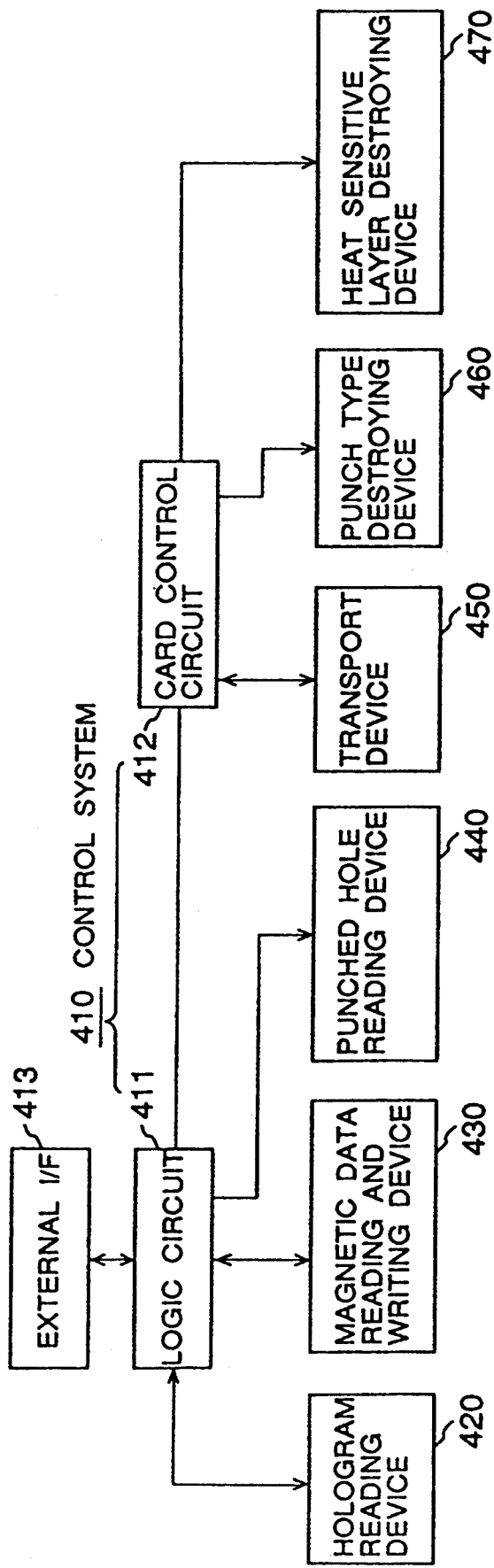
FIG. 20 shows a block diagram of a control system for the card reader/writer of FIG. 19.
Figure 21:
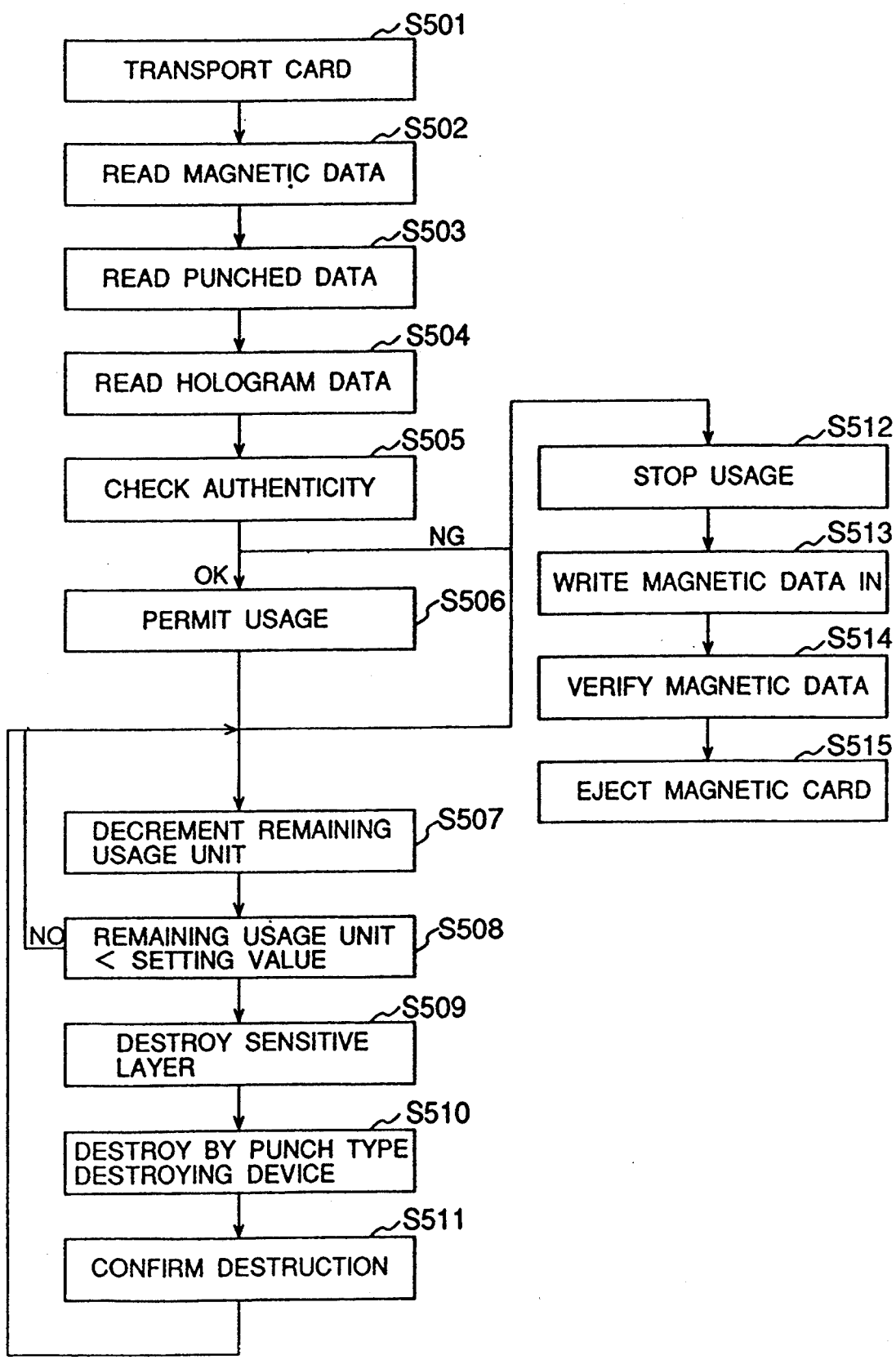
FIG. 21 shows a flowchart for describing the card reader/writer operation of FIG. 19.
Figure 22:
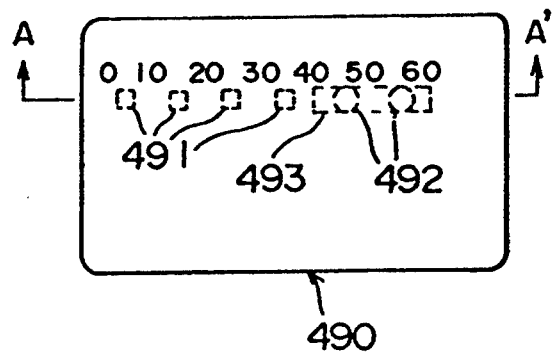
FIG. 22 shows an example of a magnetic card used with a card reader/writer in accordance with this invention.

FIGS. 19–21 show an embodiment of this invention as a card reader/writer. FIG. 19 is an outline of the construction, FIG. 20 is a control system block diagram, and FIG. 21 is a flowchart for describing the operation. FIG. 22 shows an example of a magnetic card used with the card reader/writer of this embodiment, and FIG. 23 shows a conceptual cross-section of the FIG. 22 drawing along axis A—A'.

As shown in FIG. 22, a magnetic card 490 used in this embodiment is provided with a plurality of hologram images in a visible area and with concealed holograms 491 which are concealed so as not to be visible.

In these concealed holograms 491, respectively different hologram data are recorded in accordance with the usage units. In this embodiment, in the concealed holograms 491, the data of 60 usage units are initially encoded. In the state shown in FIG. 22, two punch holes 492 are already opened, indicating a remainder of 40 to 50 usage units.

Figure 23:
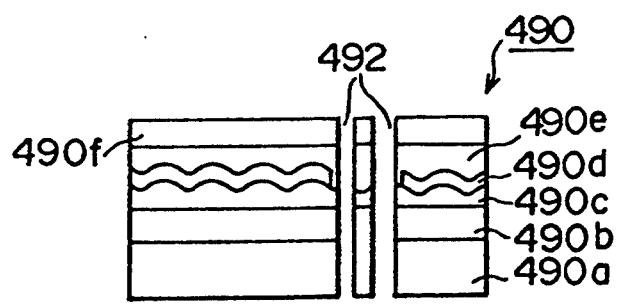
FIG. 23 shows a conceptual cross-section view along axis A—A' of FIG. 22.

This magnetic card, as shown in FIG. 23, is formed from a base material 490a such as polyvinyl chloride or polyester, a magnetic layer 490b formed from such material as $Fe_3O_4$, a hologram formed layer 490c, where a relief hologram is formed of molded resin, a reflecting heat sensitive metal thin film layer 490d formed of a low melting point metal such as tin, aluminum or indium, a concealed layer 490e formed from ink which does not include infrared absorbing pigments such as carbon, and a protective layer 490f.

In the FIG. 23 state, two punch holes 491 are opened in the magnetic card. These punch holes 491 are in a straight line, while in the punched areas, wider areas of the heat sensitive metal thin film layer 490d are destroyed to form heat sensitive destroyed areas 493.

In the concealed area 493a, by using ink that reflects visible light but transmits infrared light, since the hologram formed layer 490c position, destroyed condition and data recorded in the hologram formed layer 490c cannot be seen visually, security is further enhanced.

The card reader/writer of this embodiment includes a control system 410, a hologram reading device 420, a magnetic data reading and writing device 430, a punched hole reading device 440, a transport device, a punch type destroying device 460 and a heat sensitive layer destroying device 470.

The control system 410 is connected to the hologram reading device 420, magnetic data reading and writing device 430 and punched hole reading device 440. Based on data from these reading devices 420, 430 and 440, authenticity detection control is performed by a logic circuit 411 which is connected to a transport device 450, the punch type destroying device 460, the heat sensitive layer destroying device 470, a card control circuit 412 for performing control of these devices 450, 460 and 470, and an external interface (I/F) for interfacing with external systems such as telephone or ticket vending machines (not shown in the figure). The following control operation is performed in accordance with the flowchart of FIG. 21.

The hologram reading device 420 is a device for reading the concealed hologram 491 of the magnetic card 490, and comprises a laser oscillator 421 for oscillating an infrared laser and a line sensor 422 which possesses sensitivity to infrared light, and drive and reading circuits.

The magnetic data reader/writer system is a publicly known system capable of reading and writing magnetic data. In FIG. 19, the magnetic head for reading and writing magnetic data of the magnetic card 490 is omitted.

The punched hole reading device 440 is a device for accurately reading the-punched holes 492 opened in the magnetic card 490 by the punch type destroying device 460. This punched hole reading device 440 is also needed for verifying the punched hole data. For example, if a punched hole deviates from the predetermined position, the hologram data at that position is read, while the punched hole data is also read. In this embodiment, the laser oscillator 421 is used as the light source for the hologram reading device 420, and a photosensor 441 such as a photodiode is added.

The transport device 450 is a device for accurately transporting the magnetic card 490 to the predetermined position at each operation, and includes a transport roller 451 and a transport guide 452.

The punch type destroying device 460 is a device for destructively eliminating the concealed hologram 491 of the magnetic card 490 in accordance with the remaining validity and is provided with a punch blade 461 or other means.

The heat sensitive layer destroying device 470 is a device which uses a thermal head to destroy the heat sensitive metal thin film layer 490d of the magnetic card 490.

It is desirable that the heat sensitive destroyed area 493 destroyed by the thermal head of the heat sensitive layer destroying device 470 is larger than the concealed hologram 491 area, in order to reliably destroy the concealed hologram 491. In this case, the punched hole 492 area removed by the punch blade 461 of the punch type destroying device 460 may be larger or smaller than the area of the concealed hologram 491.

Following is a description of the operation of the card reader/writer of this embodiment with reference to the flowchart shown in FIG. 21.

When a magnetic card 490 is inserted in the card intake, the transport device 450 transports the card 490 to the predetermined position S501. Then the magnetic data reading and writing device 430 reads the magnetic data M S502, the punched hole reading device 440 reads the punched data P S503, and the hologram reading device 420 reads the hologram data H S504.

In the logic circuit 441, the magnetic card 490 authenticity is checked S505. In practice, the remaining usage units N of the magnetic card 490 is derived from the hologram data H and punched data P (in the FIG. 21 example, N=40 to 50). According to whether or not this data (remaining usage units N) coincides with the magnetic data M, the authenticity of the magnetic card 490 is checked. In this case, for example, if the magnetic data indicates N=60, improper usage can be clearly determined.

In addition, permissible usage is confirmed from external devices S506.

At step S505, if a valid card (OK) is determined, and use is permitted from the external devices, the remaining usage units are decremented S507. At this point, whether or not the remaining number of usage units is smaller than the setting value is checked S508, and if smaller, the remaining usage units are repeatedly decremented S508.

If the remaining usage units exceed the setting value, the heat sensitive metal thin film layer 490d is destroyed by the heat sensitive layer destroying device 470 to form a heat sensitive destroyed area 493 S509, the concealed hologram 491 is destroyed by the punch type destroying device 460 S510 and the destruction is confirmed by the punched hole reading device 440.

In other words, when a decrement command is sent from an external device connected to the interface 413, if the number of remaining usage units N is smaller than the previously set value, according to this extent, the heat sensitive metal thin film layer 490d of the hologram 491 is destroyed, and additionally, the heat sensitive destroyed area 493 is further destroyed and removed by the punch type destroying device 460. Whether or not the destruction was properly performed is confirmed as indicated in FIG. 14 by the laser oscillator 421 of the punched hole reading device 440 and the photosensor 441 provided at the reflecting side of the card 490.

At step S505, if a counterfeit card (NG) is determined or the remaining usage units have reached 0 S506, the command to disallow use of the external device is emitted S512 by the magnetic data reading and writing device 430. After performing magnetic data writing S513 of the magnetic card 490 and magnetic data verification S514, the magnetic card 490 is ejected S515 by the transport device 450.

In other words, if an end signal is received from the external device or the remaining validity has reached 0, the magnetic card 490 usage is stopped, and together with rewriting the magnetic data M S513, after performing the verifying operation S513, the magnetic card 490 is ejected S514.

Consequently, by using this type of card reader/writer, use of a counterfeit or altered card can be prevented and a correctly operating card system is enabled.

The foregoing description does not limit this embodiment, numerous variations and modifications are possible which are also within the scope of this invention.

The punched hole reading device light source is also used as the hologram reading device light source, but independent light sources can also be provided.

Although an example of an invisible concealed hologram was described as the hologram data, operation is also possible using a visible hologram.

Also, as the heat sensitive layer destroying device as well, for example, a device can be used that comprises a rubber roller for shifting a card that is conductive as a positive electrode and a needle shaped negative electrode. When an electrical discharge is produced between the card and needle shaped electrode, the heat sensitive metal thin film layer 490d is destroyed. In this case, since the conductivity of the heat sensitive metal thin film layer 490d is best among the card composing layers, the electrical current can flow through this layer. Also, destruction does not occur from the rubber roller means, since the card contacting area is small and the charge distribution wide, but does occur from the needle shaped electrode because of the dense distribution at the tip. By using this type of device, there is an advantage of obtaining a sharp destroyed section.

Figure 26:
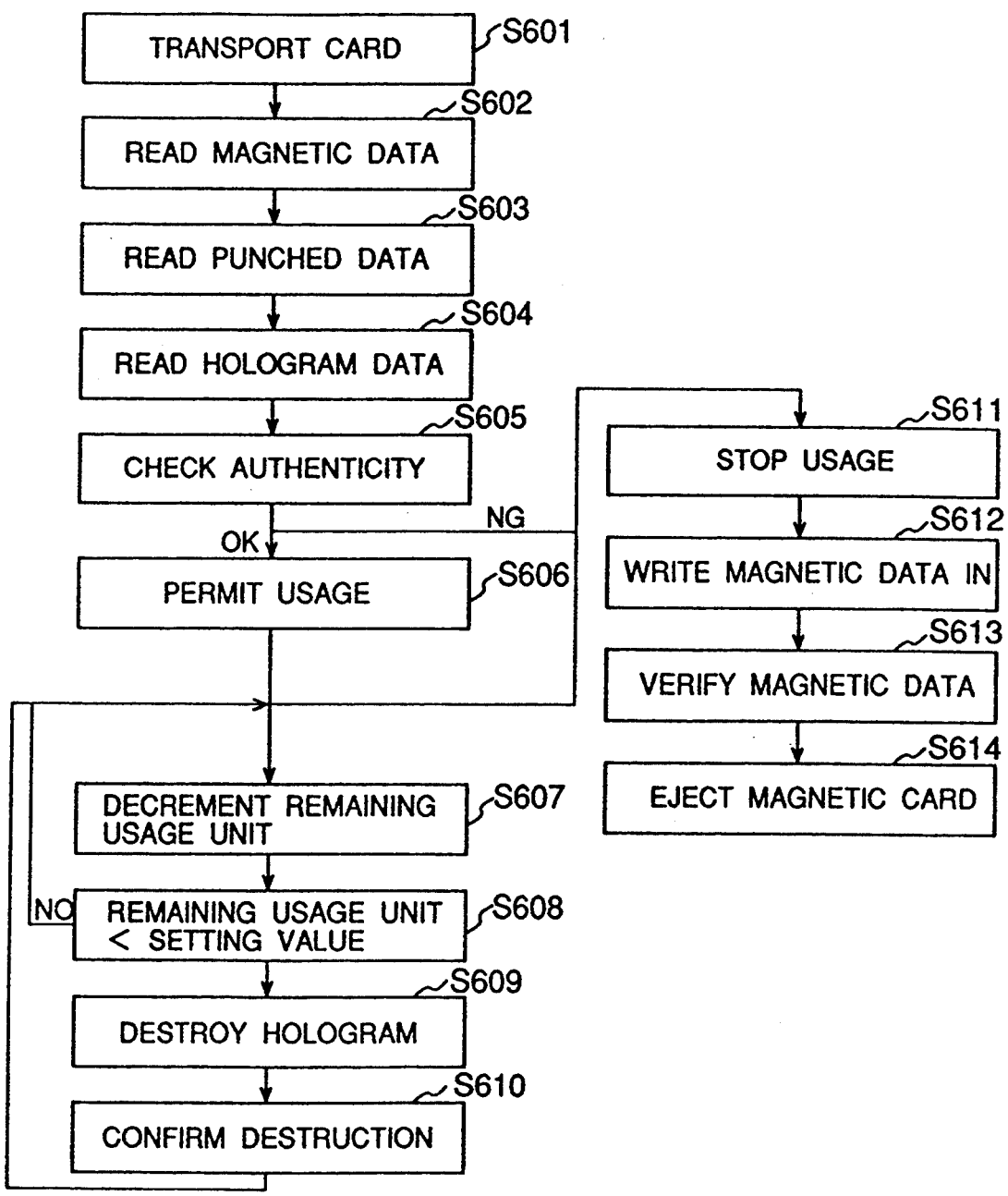
FIG. 26 shows a flowchart for describing the card reader/writer operation of FIG. 24.
Figure 27:
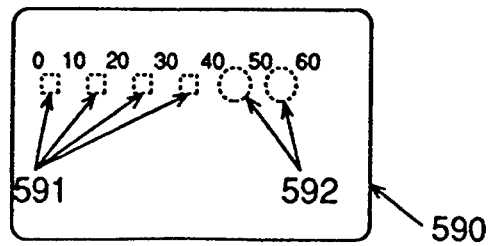
FIG. 27 shows an example of a magnetic card used with a card reader/writer in accordance with this invention.
Figure 28:
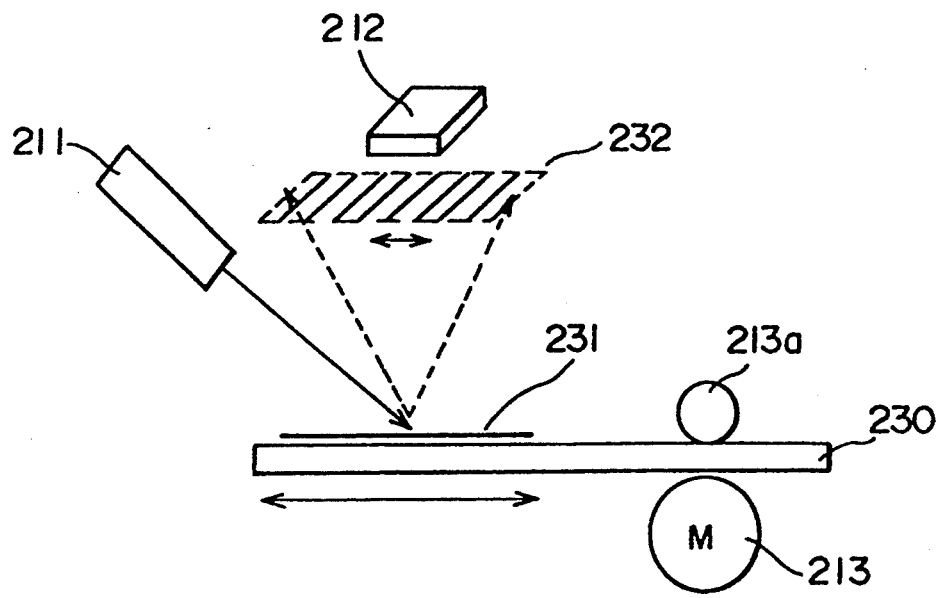
FIGS. 28 and 29 are a schematic view and a diagram illustrating prior art, respectively.
Figure 29:
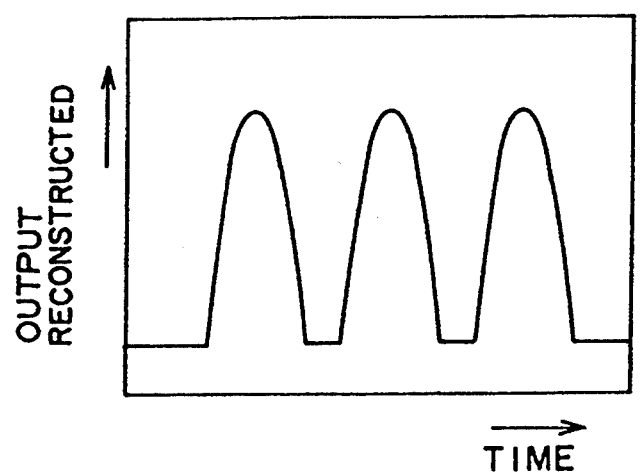

FIGS. 24–26 show another embodiment of this invention as a card reader/writer. FIG. 24 shows an outline of the construction, FIG. 25 shows a block diagram of a control system, and FIG. 26 is a flowchart describing the operation. FIG. 27 shows an example of a magnetic card used with the card reader/writer according to this invention.

As shown in FIG. 27, the magnetic card 590 used with this embodiment is provided with concealed hologram areas 591 on the card base material in which a plurality of hologram images are arranged and concealed so as to be invisible in the range of visibility.

In these concealed hologram areas 591, different hologram data are recorded according to the valid usage. In this example, the data for 60 usage units are initially encoded in the concealed holograms 591. In the state indicated in FIG. 27, two punched holes 592 are already opened, indicating 40–50 remaining units.

Among the devices comprising the card reader/writer of this embodiment are a control device 510, a hologram reading device 520, a magnetic data read/write device 530, a punched hole reading device 540, a transport device 550 and a punch type destroying device 560.

The control device 510 is connected to the hologram reading device 520, a magnetic data reading device 530, and punched hole reading device 540. Based on the data from these reading devices 520, 530 and 540, a logic circuit 511 performs authenticity detection control, and is connected to the transport device 550, the punch type destroying device 560, a card control circuit 512 for controlling these devices 550 and 560, and an external interface 513 for an external device such as a telephone or ticket vending machine. Following is a description of the control operation with reference to the flowchart of FIG. 26.

The hologram reading device 520 is a device for reading the concealed hologram 591 of the magnetic card 590 and mainly comprises a laser oscillator 521 for oscillating infrared laser light, a line sensor 522 which is sensitive to infrared, drive circuits for these components, and a reading circuit.

The magnetic data reading and writing device 530 is a publicly known system capable of reading and writing magnetic data. In FIG. 23, the magnetic head for reading and writing magnetic data of the magnetic card 590 is omitted.

The punched hole reading device 540 is a device for accurately reading the punched holes 592 opened in the magnetic card 590 by the punch type destroying device 560. This punched hole reading device 540 is also needed for verifying the punched hole data. For example, if a punched hole deviates from the predetermined position, the hologram data at that position is read, while the punched hole data is also read. In this embodiment, the laser oscillator 521 is used as the light source for the hologram reading device 520, and a photosensor 541 such as a photodiode is added.

The transport device 550 is a device for accurately transporting the magnetic card 590 to the predetermined position at each operation, and includes a transport roller 551 and a transport guide 552.

The punch type destroying device 560 is a device for destructively eliminating the concealed hologram 591 of the magnetic card 590 in accordance with the remaining validity and is provided with a punch blade 561 or other means. The punched hole 592 area removed by this blade 561 is larger than the area of the concealed hologram 591.

Following is a description of the operation of the card reader/writer of this embodiment with reference to the FIG. 27 flowchart.

When a magnetic card 590 is inserted in the card intake, the transport device 550 transports the card 590 to the predetermined position S601. The magnetic data reading and writing device 530 reads the magnetic data M S602, the punched hole reading device 540 reads the punched data P S603, and the hologram reading device 520 reads the hologram data H S604.

In the logic circuit 541, the magnetic card 590 authenticity is checked S605. In practice, the remaining usage units N of the magnetic card 590 are derived from the hologram data H and punched data P (in the FIG. 21 example, N=40 to 50). According to whether or not this data (remaining usage units N) coincides with the magnetic data M, authenticity of the magnetic card 590 is checked. In this case, for example, if the magnetic data indicates N=60, improper usage can be clearly determined. In addition, permissible usage is confirmed from external devices S606.

At step S605, if a valid card (OK) is determined, and use is permitted from the external devices, the remaining usage units are decremented S607. At this point, whether or not the number of remaining usage units is smaller than the setting value is checked S608, and if smaller, the remaining usage units are repeatedly decremented S608.

If the remaining usage units exceed the setting value, the concealed hologram 591 is destroyed S609 by the punch type destroying device 560 and in addition, the destruction is confirmed by the punched hole reading device 550 S610.

In other words, when a decrement command is sent from an external device connected to the interface 513, if the number of remaining usage units N is smaller than the previously set value, according to this extent, the hologram 591 is destroyed and removed by the punch type destroying device 560. Whether or not the destruction was properly performed is confirmed as indicated in FIG. 24 by the laser oscillator 521 of the punched hole reading device 540 and the photosensor 541 provided at the reflecting side of the card 590.

At step S605, if a counterfeit card (NG) is determined or the remaining usage units have reached 0 S606, the command to disallow use of the external device is emitted S611 by the magnetic data reading and writing device 530. After performing magnetic data writing S612 of the magnetic card 590 and magnetic data verification S613, the magnetic card 590 is ejected S615 by the transport device 550.

In other words, if an end signal is received from the external device or the remaining usage units have reached 0, the magnetic card 590 usage is stopped, and together with rewriting the magnetic data M, after performing the verifying operation, the card 590 is ejected.

Consequently, by using this type of card reader/writer, use of a counterfeit or altered card can be prevented and a correctly operating card system is enabled.

The foregoing description does not limit this embodiment, and numerous variations and modifications are possible which are also within the scope of this invention.

The punched hole reading device light source is also used as the hologram reading device light source, but independent light sources can also be provided.

Although an example of an invisible concealed hologram was described as the hologram data, operation is also possible using a visible hologram.

What is claimed is:

1. A hologram code reading system comprising:
    a light source, illuminating with reconstruction light a hologram recorded area wherein codified data is recorded as image data, said light source including a focusing element positioned to focus the reconstruction light to a reconstruction position such that the reconstruction light converges toward the reconstruction position,
    a code reading sensor arranged at the reconstruction position of the hologram reconstruction image played back by the reconstruction light of said light source, and
    control means for obtaining the codified data from said hologram reconstruction image.

2. A hologram code reading system according to claim 1 wherein
    the wavelength of the said light source differs between a time of recording and a time of playing back the said hologram.

3. A hologram code reading system according to claim 2 wherein
    the wavelength of the said light source is shorter at the time of playing back than at the time of recording the said hologram.

4. A hologram code reading system according to claim 1 wherein
    said light source generates light which is outside the visible spectrum.

5. A hologram code reading system according to claim 4 wherein
    said light source generates infrared light.

6. A hologram code reading system according to claim 1 wherein
    said light source is arranged at an inclination with respect to said hologram recorded area or,
    said light source is arranged in parallel or perpendicularly with respect to said hologram recorded area.

7. A hologram code reading system according to claim 6 wherein
    the reconstruction light illuminating direction of said light source is arranged in an essentially perpendicular manner with respect to said hologram recorded area and,
    said code reading sensor is arranged in parallel with respect to said hologram recorded area.

8. A hologram code reading system according to claim 7 wherein
    said reconstruction light illuminating direction is set so that reflected 0-order diffracted light from said hologram does not return to said light source.

9. A hologram code reading system according to claim 1 wherein
    said control means is additionally provided with an identification code verifying means.

10. A hologram code reading system according to claim 1 further comprising
    light reflecting means provided in a light path from said light source to said hologram code reading sensor.

11. A hologram code reading system according to claim 1 further comprising
    light refracting means provided in a light path from said light source to said hologram code reading sensor.

12. A hologram code reading system according to claim 1 further comprising
    a distance measuring light source for measuring a distance between said hologram recorded area and said hologram code reading sensor.

13. A hologram code reading system according to claim 1 wherein
    said focusing element focuses the reconstruction light to have an aperture angle between 0.5 and 10 degrees.

14. A hologram code reading process comprising the steps of
    illuminating a hologram recorded area which has been recorded with codified data in the form of image data using focused reconstruction light which converges toward a reconstruction position; and
    reading, using a code reading sensor, the hologram reconstruction image reproduced by the reconstruction light from the light source and arranged at the reconstruction position to obtain codified data from the read hologram reconstruction image.

15. A hologram code reading process according to claim 14 wherein
    reading is enabled for a hologram reconstruction image in which different wavelength light is used from that at the time of recording the said hologram.

16. A hologram code reading process according to claim 15 wherein said different wavelength light has a shorter wavelength than that at the time of recording.

17. A hologram code reading process according to claim 14 wherein invisible light is used for the said reconstruction light.

18. A hologram code reading process according to claim 17 wherein infrared light is used for the said reconstruction light.

19. A hologram code reading process according to claim 14 wherein the said reconstruction light illuminates at an inclination with respect to the said hologram recorded area and, reading is performed by a code reading sensor arranged in parallel or perpendicularly with respect to the said hologram recorded area.

20. A hologram code reading process according to claim 14 wherein the illumination of the said reconstruction light is essentially perpendicular with respect to the said hologram recorded area and, reading is performed by a code reading sensor arranged in parallel with respect to the said hologram recorded area.

21. A hologram code reading process according to claim 20 wherein the said hologram is illuminated from a direction such that 0-order diffracted light reflected from the said hologram does not return to the said light source.

22. A hologram code reading process according to claim 20 wherein in order to reduce the 0-order diffracted light reflected from the said hologram to the said light source, a portion of the said reflected light is reflected.

23. A hologram code reading process according to claim 14 wherein the code read from the said hologram is used for the identification code and verification.

24. A hologram code reading process according to claim 14 which proceeds while light from the said light source is reflected by a reflecting means with respect to the said code reading sensor.

25. A hologram code reading process according to claim 14 which proceeds while light from the said light source is refracted by a refracting means with respect to the said code reading sensor.

26. A hologram code reading process according to claim 14 wherein a distance measuring light source is used for measuring the distance between the said hologram recorded area and said code reading sensor.

27. A hologram code reading process according to claim 14 comprising the further step of focusing the reconstruction light to have an aperture angle between 0.5 and 10 degrees.

28. A hologram code reading process according to claim 27 wherein the focused reconstruction light is light having an aperture angle between 1 and 5 degrees.

* * * * *